Sept. 28, 1937.   H. D. REY   2,094,084
DRIED FRUIT SOFTENING MACHINE AND PROCESS
Filed June 1, 1936   2 Sheets-Sheet 1

INVENTOR.
HENRI DANIEL REY
BY Miller Boyken & Bried
ATTORNEY.

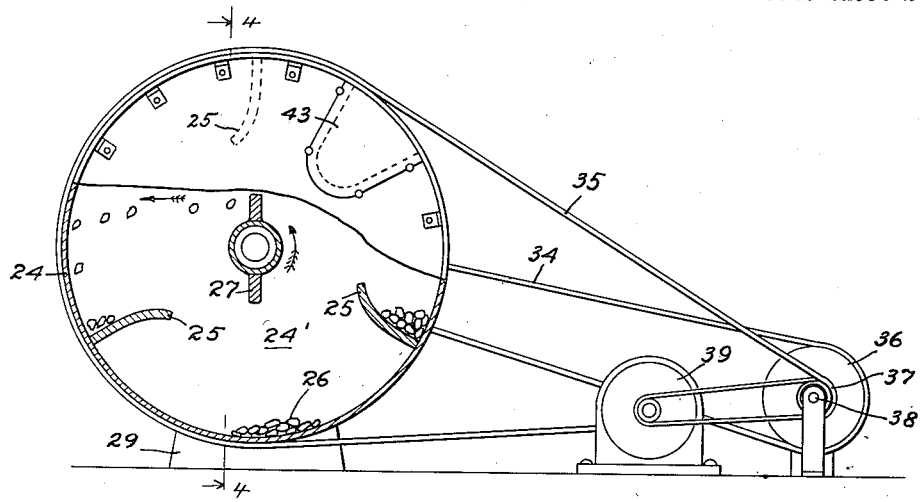
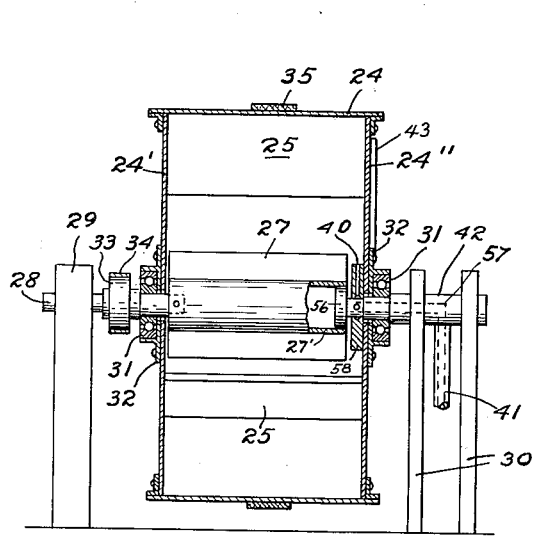
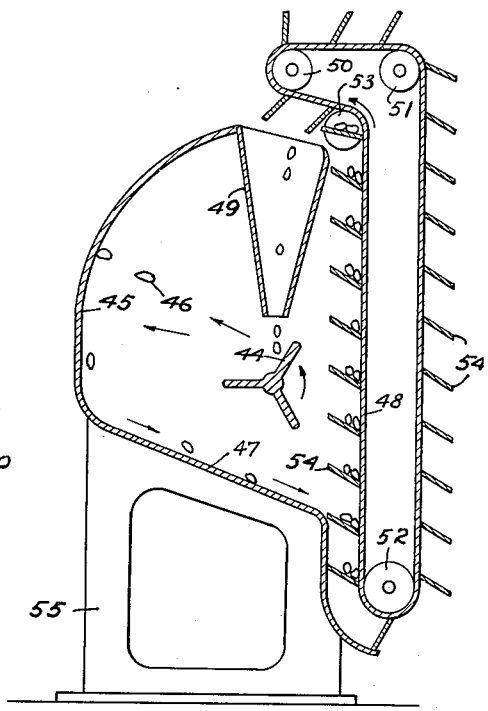

Patented Sept. 28, 1937

2,094,084

UNITED STATES PATENT OFFICE 2,094,084

DRIED FRUIT SOFTENING MACHINE AND PROCESS

Henri Daniel Rey, Papeete, Tahiti, assignor to The Anglo California National Bank of San Francisco, trustee, San Francisco, Calif., a corporation Application June 1, 1936, Serial No. 82,835

1 Claim. (Cl. 99—104)

This invention relates to methods and apparatus for kneading dried fruits into soft and pliable condition as generally described in my copending applications filed under Serial Nos. 68,885 and 73,699, and the present invention has for its object improvements in such processes and machines which are more adapted to certain kinds or qualities of dried fruits. Features and advantages of the present construction will appear in the following description and accompanying drawings.

In the drawings Fig. 1 is a vertical cross section, as seen from the line 1—1 of Fig. 2, of a machine for carrying out my invention.

Fig. 3 is a side elevation of a modified form of the machine.

Fig. 4 is a vertical cross section of the machine of Fig. 3 as seen from the line 4—4 of Fig. 3.

Fig. 5 is a vertical cross section of a further modified form of the invention.

Before describing the drawings in detail it may be stated that the present improvement is based on the novel idea that if commercially dried fruit bodies were hurled violently against a firm barrier many times in repetition the bodies would become softened by the impacts and the juices or syrups contained in the bodies would be worked into the fibers evenly throughout the bodies. The machines of the present disclosure accomplish the desired result by means of a high speed revolving paddle wheel or "batter" which not only propels the fruit bodies outward with great force against a barrier wall to set up the desired impacts, but also delivers an initial impact to each fruit body like a batsman would a ball, in propelling it outward, thus subjecting the fruit bodies to an impact at both ends of the travel of the bodies.

Figure 2:
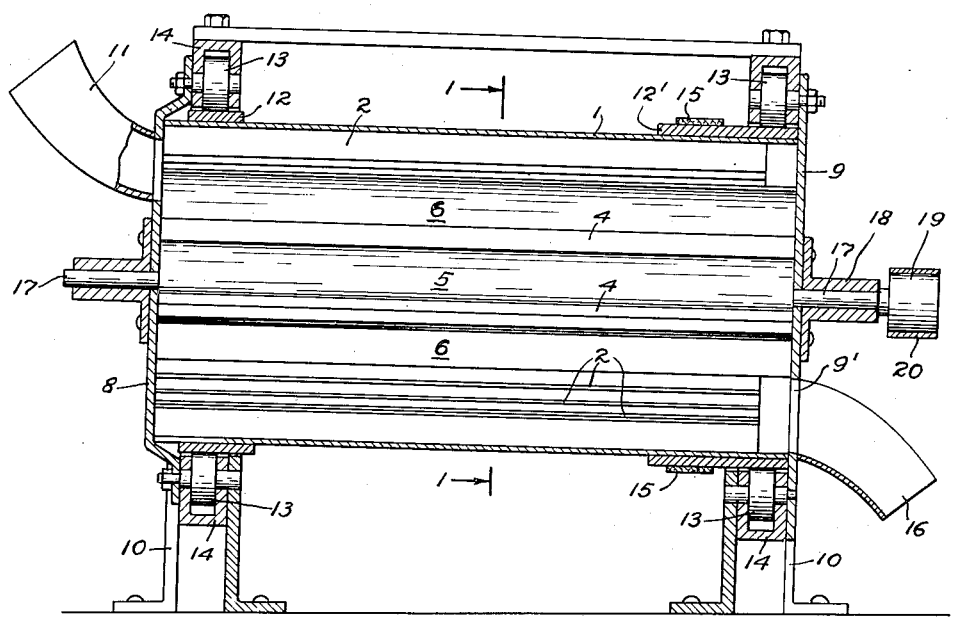
Fig. 2 is a longitudinal cross section of the machine as seen from the line 2—2 of Fig. 1.
Figure 1:
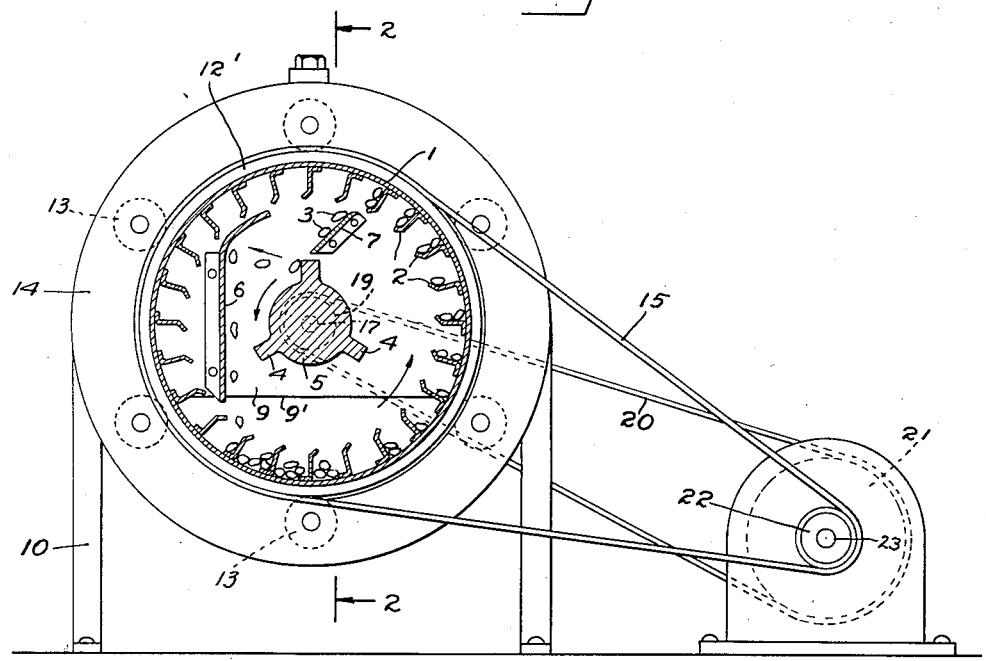

In Figs. 1 and 2 the machine takes the form of a revolvable cylinder 1 carrying an internal series of longitudinally arranged, closely disposed, lifting blades 2 which, during the revolution of the cylinder in the direction of the lower arrow, lift and drop the dried fruit bodies 3 in front of the blades or paddles 4 of a high speed paddle wheel 5 revolving in direction of the small arrow, and which paddle wheel strikes the fruit bodies 3 with great violence and hurls them in a constant stream against a fixed baffle wall 6 from which they fall to the bottom of the cylinder to be immediately carried upward and again dropped in front of the high speed revolving paddles. A guiding plate 7 insures that the fruit bodies will only fall in front of the paddles, or to the left of the vertical center line of Fig. 1 so as to insure their striking the baffle plate 6, and which is curved at its upper end to intercept any fruit bodies which may be projected upward.

The baffle plate 6 and guide plate 7 are supported at opposite ends to end plates 8 and 9 of the machine which are stationary and form the ends of the fixed frame 10 of the machine.

End plate 8 has an opening in its upper portion into which extends a fruit delivery chute 11, and the plate 9 at the opposite end of the machine is cut off at its bottom as at 9' to provide a discharge opening for the treated fruit bodies, and which due to a slight inclination of the machine toward the discharge end, gravitate slowly toward that point for exit into a chute 16 after having been carried around within the cylinder and dropped into the path of the high speed paddle wheel many times.

The cylinder is provided with external circular tracks 12 which roll within two series of rollers 13 revolvably carried within circular channels 14 constituting part of the frame of the machine, and one of the tracks 12 is preferably widened beyond the rollers 13 as at 12' to form a better surface for contact of a driving belt 15 by which the cylinder is revolved.

The paddle wheel 5 may be of metal or wood, and has a projecting shaft 17 carried in bearings 18 secured to the end plates 8, 9, and secured to one end of the shaft is a driving pulley 19 over which passes a belt 20. Belts 15 and 20 may be driven by suitable pulleys 21, 22 on any suitable motor or power shaft 23.

The action of the machine will be easily understood from the above description. The degree of softening of the fruit bodies in the treatment will depend on several factors, such as the hardness or dryness of the dried fruit bodies being treated, the kind of fruit—whether dried prunes, peaches, apricots, cherries, plums, etc.—whether the fruit is given a prior washing or steaming, the speed of the paddle wheel or rotor, the length of the cylinder and degree of its inclination which determines the length of time the fruit bodies are subjected to the treatment. The speed of the rotor and time of treatment should be adjusted to the point that the fruit bodies are softened throughout, yet without undue abrading of the exterior surfaces of the fruit due to impact or breaking the pits of drupaceous fruits. The minimum abrading action is secured by avoiding as much as possible any sliding action of the fruit bodies at either point of impact, as is insured by the construction set out. The barrier plate against which the fruit is impacted, as well as the rotor blades, may be of any desired material or even a firm grade of rubber, or otherwise slightly padded to reduce any abrading tendency upon the fruit, where delicate fruits are being treated by the process.

In the form of machine shown in Figs. 3 and 4 the fruit does not follow a continuous path of travel through the machine, but is handled in batches, which are loaded and unloaded after the machine has been rotated to bring the fruit to the required condition.

In this machine the cylinder 24 is relatively short and is fitted internally with but two or three lifting blades or shelves 25 which carry the fruit 26 upward and drop it into the path of a two-bladed high speed rotor or paddle wheel 27 which strikes the falling fruit bodies and hurls them violently against the descending wall of the cylinder or drum, for repetition of the cycle as long as the machine runs.

The rotor is secured at one end only to a shaft 28 which is revolvably supported in a floor pedestal type of bearing 29, and on which shaft the drum 24 is revolvably supported at one end 24' in an annular ball bearing 31 held in circular flange 32 secured to the head 24' of the drum so that it can be revolved independently of the rotor and with very little friction so as not to pick up speed from the faster moving rotor shaft. The opposite end 24'' of the drum is supported similarly on a ball bearing 31 as described but which revolves on a fixed shaft 42 supported in floor pedestals 30 and the inner end of which fixed shaft carries an annular ball bearing 56 revolvably supporting the adjacent end of the rotor 27 from within the hollowed out hub 27' of the same. Fixed shaft 42 is bored at 57 and connected with a pipe 41 for the admission of a small quantity of steam to the drum to aid in softening extra hard, dry fruit, if desired, and which steam would enter through several radial holes 40 in a collar 58 on the shaft and which holes communicate with its bore 57.

The rotor shaft carries a driving pulley at 33 driven by a belt 34, and the drum is driven by a belt 35, both belts receiving their power from suitable pulleys and countershafting as indicated at 36—38 in turn driven from a motor 39.

A hinged or removable door 43 is provided at one or both ends of the drum for loading and unloading and also to serve for examination of the fruit to ascertain whether the treatment has been carried out far enough.

In the modified machine of Fig. 5 the high speed rotor is shown at 44 operating within a special shaped casing providing a barrier or impact wall at 45 extending normal to the path of the fruit bodies 46 projected from the rotor, and a lower slanted wall 47 guiding the bodies downwardly into the rising cups or pockets of an endless belt elevator 48 which at once carries the bodies upward and dumps them into a chute 49 from which they drop again into the path of the rotor blades.

The belt elevator is suitably guided over the pulleys or rollers 50, 51 and 52, any of which, though preferably the first or last, may be the driver, while at 53 is a pair of pulleys acting upon the two outer margins of the belt, which is wider than the buckets 54, beyond the pockets so as to permit the belt to bend toward the pockets in discharging the fruit into the chute 49. This machine may be supported by a suitable frame as indicated at 55.

Having thus disclosed my improved method of treating dried fruit bodies to impact for softening the same and three modifications of high speed paddle machine for hurling the bodies against a barrier to produce the results desired, what I claim is:

The method of treating dried fruit which comprises repeatedly dropping dried fruit bodies into the path of a high speed batting element and thereby hurling the bodies against a substantially rigid barrier, and whereby each fruit body is subject to a violent impact at start and finish of its travel, all carried on until the bodies are of soft and unctuous consistency throughout from the effect of the repeated impacts.

HENRI DANIEL REY.